United States Patent
Breitenbacher et al.

(10) Patent No.: US 7,021,726 B2
(45) Date of Patent: Apr. 4, 2006

(54) METHOD AND DEVICE FOR DETERMINING A VARIABLE REPRESENTING A HYDRAULIC PRESSURE DROP ACROSS A BRAKE CIRCUIT VALVE

(75) Inventors: Juergen Breitenbacher, Winterbach (DE); Rainer Heinsohn, Tamm (DE); Andreas Klug, Untergruppenbach (DE); Peter Zeiner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/376,681

(22) Filed: Feb. 27, 2003

(65) Prior Publication Data

US 2003/0218380 A1 Nov. 27, 2003

(30) Foreign Application Priority Data

Feb. 27, 2002 (DE) ............................... 102 08 354
Jul. 17, 2002 (DE) ............................... 102 32 363

(51) Int. Cl.
*B60T 8/36* (2006.01)

(52) U.S. Cl. .................... 303/119.1; 303/20; 303/115.2

(58) Field of Classification Search ................. 303/20, 303/122.05, DIG. 9, 113.1, 199, 122.08, 303/119.1, 119.2, 84.2, 115.2
See application file for complete search history.

(56) References Cited

U.S. PATENT DOCUMENTS

| 4,651,535 | A | * | 3/1987 | Alsenz ......................... 62/225 |
| 4,928,042 | A | * | 5/1990 | Harms et al. ................ 318/254 |
| 5,176,429 | A | * | 1/1993 | Junichi et al. .......... 303/122.05 |
| 5,202,813 | A | * | 4/1993 | Uota et al. .................... 361/154 |
| 5,876,102 | A | | 3/1999 | Mori et al. |
| 6,588,263 | B1 | * | 7/2003 | Hessmert et al. .............. 73/121 |
| 6,592,192 | B1 | * | 7/2003 | Kaneda et al. ............... 303/156 |

FOREIGN PATENT DOCUMENTS

EP 25913 A * 4/1981

* cited by examiner

*Primary Examiner*—Melanie Torres
(74) *Attorney, Agent, or Firm*—Kenyon & Kenyon

(57) ABSTRACT

A method for determining a variable representing a hydraulic pressure drop across a valve of a brake circuit, in which a control pulse, designed such that abrupt braking pressure changes are suppressed, is applied to the valve, and in which the hydraulic pressure drop across the valve is determined from the knowledge of the control pulse.

10 Claims, 3 Drawing Sheets

METHOD AND DEVICE FOR DETERMINING A VARIABLE REPRESENTING A HYDRAULIC PRESSURE DROP ACROSS A BRAKE CIRCUIT VALVE

FIELD OF THE INVENTION

The present invention relates to a method for determining a variable representing a hydraulic pressure drop across a brake circuit valve.

BACKGROUND INFORMATION

A control device and a control method for a vehicle having an antilock braking system in which the pulsation of the braking pressure generated by actuating the intake valve is minimized, and noise and vibrations are eliminated, are described in German Published Patent Application No. 195 25 538. In addition, the responsiveness of the brake pedal is improved. In the control device and in the control method, the curve of the signal that opens and closes the intake valves has a gently rising and dropping slope and does not open the brake lines completely, so that the pulsation of the braking pressure is suppressed. The intake valve for minimizing the pulsation of the braking pressure is not opened completely in this control device.

SUMMARY OF THE INVENTION

The present invention relates to a method of determining a variable representing a hydraulic pressure drop across a brake circuit valve in which a control pulse designed to suppress abrupt braking pressure changes is applied to the valve. The hydraulic pressure drop across the valve is determined from the knowledge of the control pulse. The determination of the pressure drop across the valve is thus advantageously available for further regulating or controlling of the valve. Therefore, the control is a matter of an "information-collecting control," i.e., a control delivering extra information.

It is a further advantage that the value of the control pulse is used in the determination of the pressure drop. The value of the control pulse is generally a known variable and may (e.g., in the event of a control current) be determined with high accuracy and little effort. The suppression of the abrupt braking pressure changes means, for example, that the braking pressure changes so slowly over time that the valve is always in a steady state.

An advantageous design is characterized by the fact that the relationship between the pressure drop and the value of the control pulse represents a valve characteristic. The pressure drop may thus be determined in a particularly simple way. In addition, this offers the possibility of taking into account the design characteristics of the valves as early as at the time of their selection and of selecting those valves having the best suited relationship between the pressure drop and the value of the control pulse for the respective application.

The pressure drop is advantageously determined from a characteristic curve predefined for the valve.

An advantageous application area is when the valve is the intake valve of a brake circuit. This offers the possibility of advantageously controlling the pressure buildup in the wheel brake cylinder.

The control pulse is advantageously designed such that the valve is always operated under almost steady-state operating conditions. This facilitates a "gentle" valve control.

An advantageous design is characterized by the fact that the value of the control pulse is essentially reduced in a ramp-like fashion. A ramp-like reduction of the control pulse may be achieved by using simple means.

In an advantageous design, the control pulse is the valve current, i.e., the current flowing through the valve solenoid.

The control pulse may alternatively be the valve voltage, i.e., the electric voltage applied to the valve.

The device according to the present invention for determining a variable representing the hydraulic pressure drop across a brake circuit valve contains:

control means, whose control pulses are designed such that abrupt braking pressure changes are suppressed, and detecting means that determine the hydraulic pressure drop across the valve from the knowledge of the control pulse.

DETAILED DESCRIPTION

A hydraulic braking system is known from German Published Patent Application No. 197 12 889 for example (this is equivalent to U.S. Pat. No. 6,273,525).

Figure 1:
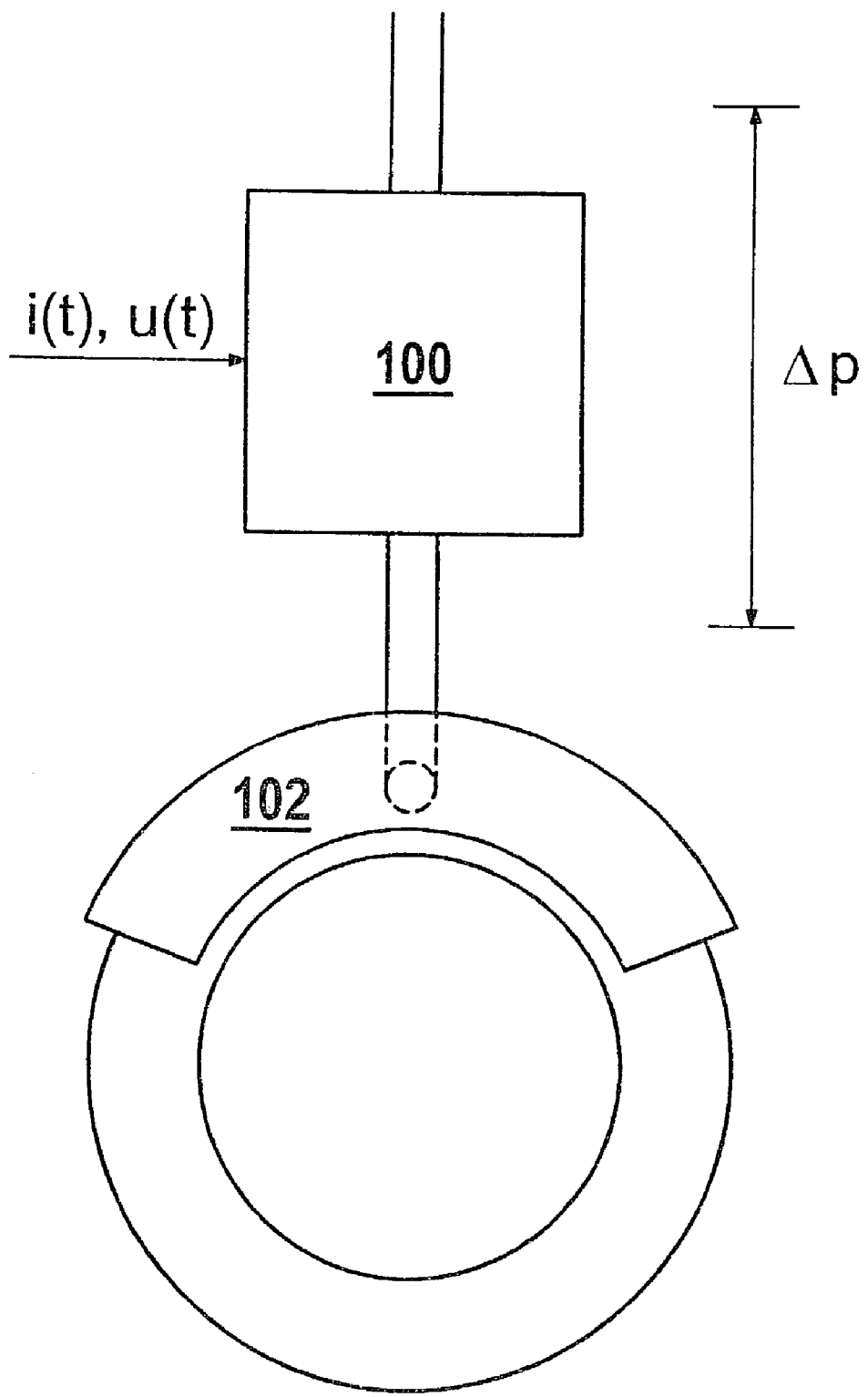
FIG. 1 shows a wheel brake, as well as an intake valve in the form of a hydraulic circuit diagram.

In FIG. 1, the present document shows a detail of the hydraulic circuit illustrated in the documents mentioned above. Here, block 100 denotes the intake valve, block 102 denotes the wheel brake, and $\Delta p$ denotes the pressure drop across the intake valve. In the exemplary embodiment, the intake valve is a pressure regulating valve or a linear solenoid valve (LSV). This has the characteristic that the solenoid current through the intake valve is essentially proportional to the pressure drop $\Delta p$ across the intake valve. The intake valve has the two following limit states:

It is open at low solenoid current and thus $\Delta p=0$.

It is closed at high solenoid current and no flow of brake fluid, i.e., the braking medium takes place.

Pressure-regulating intake valves may be characterized by two properties:

1. A static relationship between the valve power supply and the adjusted pressure (i-$\Delta p$ characteristic curve), and
2. A dynamic transient response. This may be rather well described by using a first-order time delay element, the time constant being a function of the associated hydraulic volume.

Figure 2:
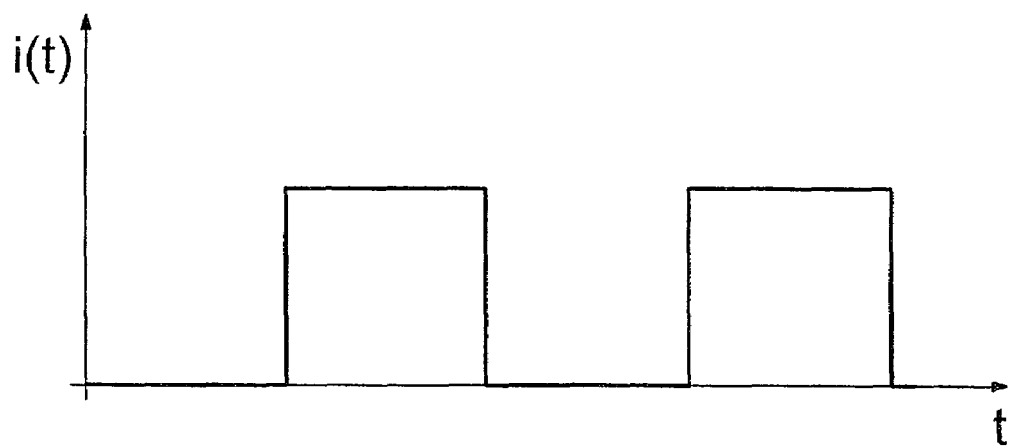
FIG. 2 shows a clocked control of the intake valve.

A clocked mode of operation of such a valve is illustrated in FIG. 2. Here, time t is plotted on the x axis and current i(t) through the valve solenoid is plotted on the y axis. The current i(t) changes between a low and a high value, and the intake valve correspondingly changes between the "open" and "closed" states producing negative results such as switching noises and high mechanical valve stresses.

Figure 3:
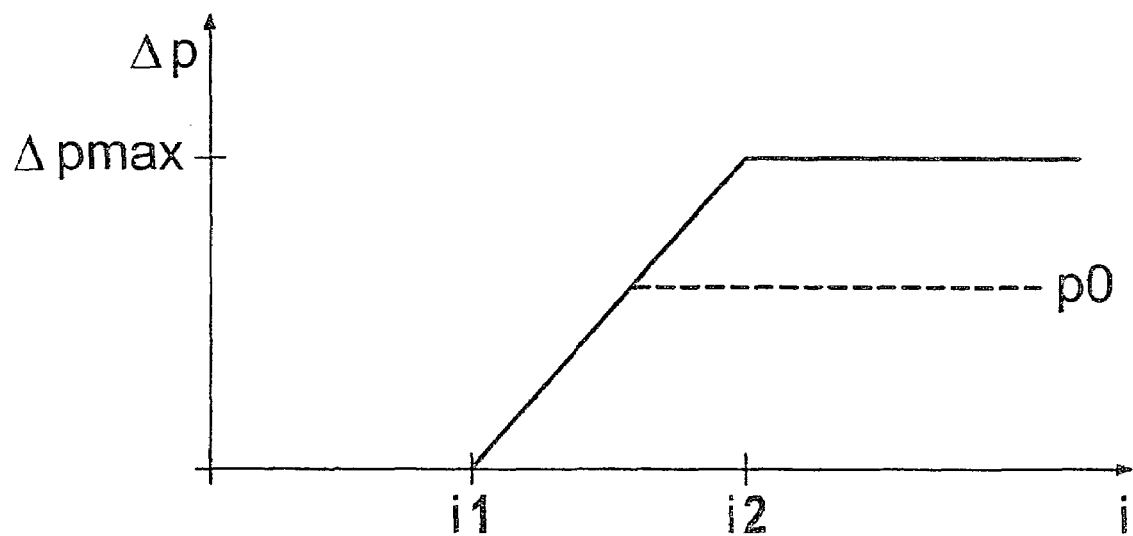
FIG. 3 shows the control of the intake valve according to the present invention.

The characteristic i-$\Delta p$ curve of an intake valve is illustrated in FIG. 3. Here, current i through the solenoid of the intake valve is plotted on the x axis, and the pressure drop $\Delta p$, to which the intake valve adjusts itself, is plotted on the y axis. At low currents $0<i<i1$ the valve is open and thus $\Delta p=0$. $\Delta p$ increases approximately linearly between $i1$ and $i2$. The maximum pressure drop $\Delta p$ adjustable by the intake valve is reached at current $i2$.

The filling of the wheel brake cylinder with the brake medium according to the present invention and with it the generation of braking pressure is now explained based upon FIG. 3.

The intake valve is initially closed and the pressure $p0$ is applied between the feed to the intake valve and the wheel brake cylinder.

A current $i>i2$ flows, for example.

Now the pressure in the wheel brake cylinder should be raised.

To achieve this, the current is reduced in a ramp-like fashion starting at $i2$. In FIG. 3, the state then moves to the left along the dashed line.

Pressure $\Delta p$ drops across the intake valve until that current value is reached at which the dashed line intersects the solid characteristic curve of the intake valve.

The state of the intake valve now moves along the characteristic curve toward point $\Delta p=0$. However, this point does not necessarily have to be reached.

The intake valve opens and the pressure in the wheel brake cylinder rises continuously.

This opening operation may be achieved via a current ramp which drops linearly over time.

The movement of the valve state along the characteristic curve means that during the pressure buildup in the wheel brake cylinder the intake valve is exclusively operated in the steady state. Such an operating mode is known in physics as "adiabatic." The opening operation runs through a sequence of steady states.

It is irrelevant here whether the valve power supply takes place via specified current or specified voltage, continuously or via pulse/pause control.

However, the pulse/pause control should be of such high frequency that the pressure regulating valve is unable to follow the high-frequency switching operations, but follows only the mean value of the pulse/pause control. The physical property that the solenoid current cannot abruptly change is used here.

Besides the main advantage, the present invention has the extra advantage of an improved switching response, so that at known current the pressure drop $\Delta p$ is also known via the $i$-$\Delta p$ characteristic curve.

This extra information $\Delta p$ is thus also available for ABS/ESP/TCS regulation as an additional determined parameter allowing a more comprehensive and more precise regulation.

In addition, the present invention provides for
the elimination of switching noises of the intake valves,
an improved pedal reaction during pressure buildup,
a more homogeneous ABS regulation by using constant pressure gradients, and
a reduction in the load on the valve.

Figure 4:
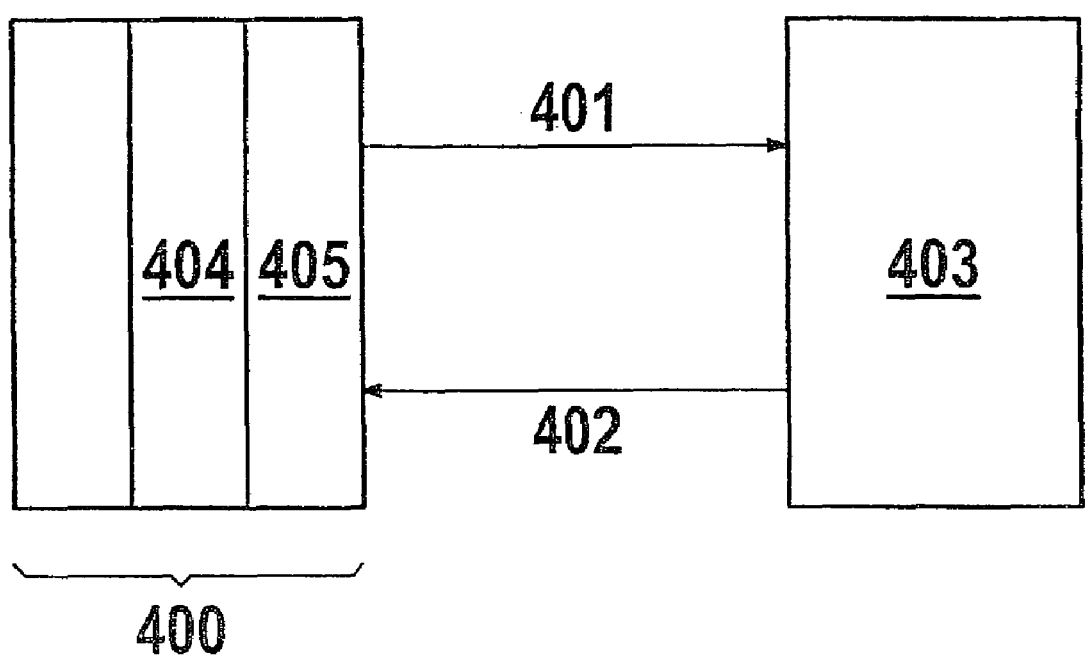
FIG. 4 shows the schematic configuration of the device according to the present invention.

The schematic configuration of the device according to the present invention is illustrated in FIG. 4. Here, block 400 denotes a control unit which, among other things, controls valve 403. This may be an intake valve to a wheel brake cylinder for example. The signals passed from block 400 to block 401 are labeled with 401. This may be the valve solenoid current for example. The control according to the present invention has the advantage that, by knowing the solenoid current, additional variables associated with the valve are known. For example, this may be the pressure drop across the valve set due to the current. This knowledge of additional variables is illustrated by arrow 402. By utilizing this extra information, the possibility exists for an improved and more precise control of the valves of an ABS system or of an ESP system.

Block 400 contains among other things:
Control means 404 whose control pulses for at least one valve are designed such that abrupt braking pressure changes are suppressed, and
Determining means 405 that determine the hydraulic pressure drop across the valve from the knowledge of the control pulse.

What is claimed is:

1. A method for determining a variable representing a hydraulic pressure drop across a valve of a brake circuit, comprising:
applying to the valve a control pulse designed such that an abrupt braking pressure change is suppressed; and
determining the hydraulic pressure drop across the valve from a knowledge of the control pulse.

2. The method as recited in claim 1, wherein:
a relationship between the hydraulic pressure drop and a value of the control pulse is a valve characteristic.

3. The method as recited in claim 2, wherein:
the hydraulic pressure drop is determined from a characteristic curve predefined for the valve.

4. The method as recited in claim 1, wherein:
the valve includes an intake valve of a wheel brake.

5. The method as recited in claim 1, wherein:
the control pulse is designed such that the valve is always operated in an almost steady operating state.

6. The method as recited in claim 1, further comprising:
reducing a value of the control pulse in a ramp-like fashion.

7. The method as recited in claim 1, wherein:
the control pulse includes a current flowing through a valve solenoid.

8. The method as recited in claim 1, wherein:
the control pulse includes a valve voltage applied to the valve.

9. The method as recited in claim 1, wherein:
the hydraulic pressure drop includes a pressure drop of a brake fluid between an inlet of the valve and an outlet of the valve.

10. A device for determining a variable representing a hydraulic pressure drop across a valve of a brake circuit, comprising:
a control arrangement for providing a control pulse for the valve, the control pulse being designed such that an abrupt braking pressure change is suppressed; and
a determining arrangement for determining the hydraulic pressure drop across the valve from a knowledge of the control pulse.

* * * * *